3,035,019
CHELATE POLYMERS FROM TETRAKETONES
Rudolph W. Kluiber, Bernardsville, N.J., assignor to Union Carbide Corporation, a corporation of New York
No Drawing. Filed Mar. 30, 1959, Ser. No. 802,644
20 Claims. (Cl. 260—47)

This invention relates in general to novel chelate compounds and to polymers of certain metal derivatives of bis-(β-dicarbonyl) compounds. More particularly, it relates to an improved two-step process for preparing high molecular weight chelate polymers and to the polymers per se.

It has formerly been proposed to prepare synthetic organometallic polymers by reacting a tetraketone with a compound of a metal having a principal valence of two and a coordination number of four. With more particularity, it has been proposed to react a bis-(1,3-diketone)R compound in which R is a divalent hydrocarbon radical at least four carbon atoms in length separating the two 1,3-diketone functional groups of the tetraketone, with a compound of a metal having a principal valence of two and a coordination number of four, e.g., a salt of such a metal and an organic or inorganic acid, and preferably a salt of such a metal and the enol form of a 1,3-diketone when the tetraketone is capable of forming a stronger enolate than the diketone.

In forming chelate polymers from the bis-(1,3-diketone)R compounds specified above, two general methods have been heretofore described which may be categorized as melt polymerization and as solution polymerization. Typical of solution polymerization is the method which consists in mixing the bis-(β-diketone)R compound with the soluble metal salt in the proper proportions in a water-organic solvent mixture, adjusting the pH, and stirring the mixture until the chelate polymer precipitates. The presence of an organic solvent such as alcohol or dioxane is found to be necessary in many cases because of the insolubility of the ligands in water alone. In general, the average molecular weight of polymers prepared by solution polymerization methods tend to be lower than that of polymers prepared by melt polymerization, and also tend to vary over a wide range. Solution polymerization has the further disadvantage that contamination of the polymer with solvent and foreign ions is difficult to overcome or control.

In forming chelate polymers by melt polymerization techniques a compound of the metal, such as the acetylacetonate, and the bis-(β-diketone)R compound are mixed in the proper proportions and heated either at atmospheric pressure or under vacuum. The low boiling by-product, i.e., acetylacetonate, is removed by distillation as the polymerization progresses. The products of prior disclosed melt polymerization reactions are in general brittle glasses at room temperature and have molecular weights of not more than about 4000 and reduced viscosity values of about 0.1. To obtain polymers of even this relatively low molecular weight, reaction temperatures and reaction times are required which cause severe darkening or discoloration of the polymer, presumably due to thermal decomposition.

It is therefore the general object of the present invention to provide a process for forming chelate polymers from tetracarbonyl compounds which avoids the disadvantages of the prior art.

It is a more particular object to provide a process for forming chelate polymers from bis-(β-dicarbonyl)R compounds which have a high average molecular weight and a reduced viscosity of 0.5 and greater.

It is a further object to provide a process for preparing substantially pure cyclic chelate monomers and dimers from bis-(β-dicarbonyl)R compounds.

Further objects will be obvious from the specification, the examples therein, and the appended claims.

In accordance with the present invention it has been found that greatly improved chelate polymers suitable for forming molded and extruded articles may be prepared by reacting a beryllium salt with a bis-(β-dicarbonyl)R compound to form a low molecular weight polymer, subjecting the low molecular weight polymer to controlled degradation under vacuum conditions to produce a cyclic monomer or dimer, and thereafter polymerizing the purified monomer or dimer to form a high molecular weight chelate polymer.

The bis-(β-dicarbonyl)R compounds found to be suitable in the practice of the present invention may be classified as having the general structural formula:

$$\begin{array}{c} R' \ H \ O \quad\quad O \ H \ R' \\ | \ | \ \| \quad\quad \| \ | \ | \\ O{=}C{-}C{-}C{-}R{-}C{-}C{-}C{=}O \\ | \quad\quad\quad\quad | \\ H \quad\quad\quad\quad H \end{array}$$

wherein R is a divalent linear chain selected from the group consisting of (a) —(CH$_2$)$_n$— in which $n$ has a value of from 4 to 12;

(b) —O(CH$_2$)$_n$—O— in which $n$ has a value of from 4 to 10;

(c) 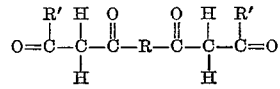

in which $n$ has a value of from 5 to 10;

(d) —O—CH$_2$CH$_2$—O—CH$_2$CH$_2$—O—CH$_2$CH$_2$—O—;

(e) 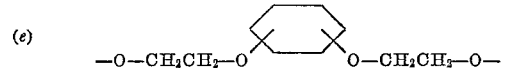

and wherein R' is a monovalent hydrocarbon radical, preferably a lower alkyl group containing from 1 to 6 carbon atoms. Suitable R' groups, however, include aromatic and cyclic aliphatic radicals such as alkyl substituted phenyl, benzyl, naphthyl and cyclohexyl. It is particularly preferred that R' be a methyl group. Because the F$_3$C— radical behaves in a chemically similar manner as H$_3$C—, the use of F$_3$C— as R' is considered to be within the scope of the invention.

The beryllium metal is introduced into the reaction system in the form of an organic or inorganic compound thereof such as the salts of organic or inorganic acids, or as ester complexes. Examples of such beryllium compounds found to be especially suitable are beryllium chloride, beryllium nitrate, beryllium sulfate, beryllium basic acetate, beryllium acetylacetonate and beryllium ethylacetoacetate.

The beryllium compounds are either readily available as commercial products, or may be prepared by any of several methods reported in the chemical literature. A typical method of preparation appears hereinafter in Example I.

Similarly the bis-(β-dicarbonyl)R compounds employed in the process of this invention are in general well known in the art and can be prepared according to any of several published methods. For instance, bis-(β-diketone) compounds may be prepared by mixing a ketone, such as acetone, diethyl ketone, acetophenone, methylethylketone or the like, with the diester of a dibasic carboxylic acid, such as azelaic, sebacic, 1,10-decamethylene dicarboxylic and other dibasic carboxylic acids having the desired number of carbon atoms separating the two carboxyl groups, and reacting the two reactants in an inert atmosphere and in the presence of a condensation catalyst such as sodium methoxide or sodamide which are effective in non-aqueous media. A more detailed treatment of the preparation of bis-(β-dicarbonyl)R compounds suitably employed is set forth hereinafter in the examples.

In order to obtain the vastly improved high molecular weight chelate polymer of the present invention it is necessary to first prepare and purify a cyclic chelate monomer or dimer which is subsequently to be polymerized. This is accomplished by forming a low molecular weight chelate polymer having repeating units corresponding to the monomer or dimer desired and then subjecting the polymer to controlled degradation. The low molecular weight chelate polymer may be prepared by the condensation reaction between the bis-(β-dicarbonyl)R compound and the beryllium compound either in aqueous solution or in the melt according to any of the several methods heretofore proposed.

For instance, a typical procedure for preparing the low molecular weight chelate polymer from solution comprises forming an equimolar aqueous solution of an inorganic beryllium salt such as the chloride, sulfate, or nitrate, and a tetracarbonyl compound, and agitating the solution at about 25° C. for a period of about 30 minutes to 24 hours or more while maintaining the pH of the system in the range of about 5 to 9, but preferably at about 7. Optionally, dioxane may be added to the reaction mixture to improve the solubility of the liquid. The crude product consists primarily of a mixture of the starting materials and the desired low molecular weight condensation polymer.

Substantially the same low molecular weight chelate condensation polymer may be obtained by reacting at a temperature of from about 100° C. to 200° C. a mixture consisting of approximately equimolar proportions of a beryllium ester complex such as beryllium acetylacetonate, and a tetracarbonyl compound. The reaction may be carried out either at atmospheric pressure or under vacuum conditions, but preferably the reaction is begun at atmospheric pressure and continued as the pressure is slowly reduced to vacuum conditions. Reaction periods vary considerably and may be as short as 30 minutes or as long as 8 hours or more depending upon the temperature, the particular reactants employed, and other like factors.

Irrespective of the method by which it is produced, the low molecular weight chelate polymer may be degraded under controlled conditions to yield either a crystalline cyclic chelate monomer or dimer depending upon the nature of the bis-(β-dicarbonyl)R compound used as the starting material as will be explained in detail hereinafter. I have found that upon heating the low molecular weight polymers described above under reduced pressure conditions, degradation of the low molecular weight polymer occurs yielding cyclic monomeric or dimeric molecules which may be isolated and collected by sublimation techniques. The temperature and pressure conditions need not be set forth with any great degree of particularity, but temperatures in the range of from about 150° C. to about 225° C. and pressures from substantially 0 to as high as about 50 mm. Hg, preferably about 1 mm. Hg, have in general been found to be suitable. The most advantageous conditions may readily be ascertained by one skilled in the art for any of the chelate polymers coming within the scope of the present invention. The sublimation procedure is however illustrated hereinafter in the examples in which the production and purification of cyclic chelate monomers is set forth in detail.

After the isolation of the crystalline cyclic chelate monomeric or dimeric product has been accomplished, high molecular weight chelate polymers can then be prepared by heating a quantity of the said dimer or monomer at a temperature above its melting point and at pressures which do not permit resublimation. Atmospheric pressure is sufficient for this purpose but in some cases pressures substantially less than 1 atmosphere may be feasible. Pressures many fold higher than atmospheric may of course be employed without substantially altering the polymerization process.

It is important to point out that the polymerization of purified cyclic chelate monomers or the dimers thereof is an addition type of polymerization, whereas the polymerization reactions heretofore proposed for preparing low molecular weight chelate polymers are of the condensation type. It is believed that the surprising improvement in the physical properties of the polymers achieved by the present process is due to the elimination or control of factors necessarily involved in a condensation type polymerization which in combination produce unfavorable results.

In forming a chelate polymer by the direct reaction, i.e. condensation, of a bis-(β-dicarbonyl)R compound and a beryllium salt, the relative concentration of the reactants in the reaction mixture, the temperature of the reaction system, the period of time over which the reaction occurs, and the nature of the beryllium compound source are all factors which have a pronounced effect upon the molecular weight of the polymer produced. A slight error in achieving an equimolar ratio of reactants will seriously lower the molecular weight of the polymer. For example, if an excess of a beryllium compound is reacted with a tetraketone the average composition of the condensation product will be affected by the low molecular weight units such as produced by the following equation:

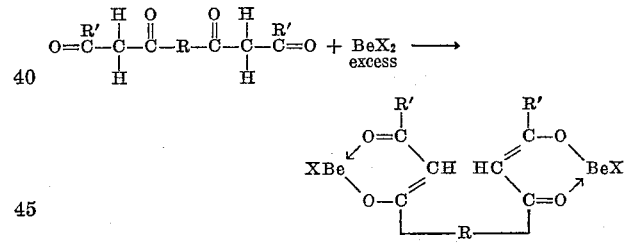

By comparison, the sublimation product resulting from the two step process of the present invention is a crystalline cyclic monomer or dimer having the general structure:

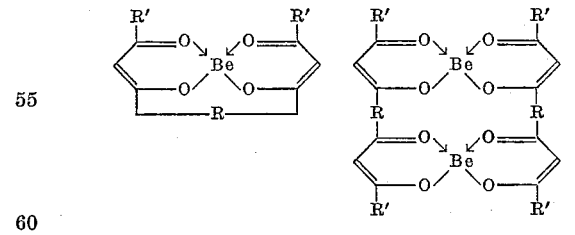

These compounds are stoichiometrically exact and are capable of forming high molecular weight polymers by addition without forming low molecular weight species.

In a condensation polymerization reaction, byproducts are produced from the residues of the beryllium compound which function as chain terminators. Conventionally, the partial removal of these by-products is accomplished by permitting them to be volatilized out of the reaction system. As the polymer molecular weight increases, however, the viscosity of the reaction mass increases, rendering the removal of the by-products increasingly difficult. In order to decrease the viscosity of the reaction mass elevated temperatures are required. At these temperatures, particularly in the presence of stoichiometric amounts of metal ions, cleavage and/or condensation reactions of the organic ligand occur giving rise to reduced molecular weight and pronounced color formation. The addition polymerization of the present invention on the other hand, produces no by-products and may thus be carried out at temperatures from 50° C. to 100° C. or more below those normally used in condensation type polymerization processes.

A still further advantage stems from the fact that addition polymerization proceeds rapidly to form long chain polymers thereby minimizing the opportunity for decomposition of the polymer already formed. Condensation polymerization proceeds relatively much more slowly, particularly toward the end of the reaction when the melt is being heated to high temperatures to decrease the viscosity of the reaction mass. Polymer decomposition is thereby favored.

Properties of the novel monomers, dimers and improved polymers of this invention and methods whereby they can be prepared are illustrated in the following examples.

Example I

Beryllium acetylacetonate is advantageously prepared according to the method of Combes, Compt. rend., 119 1222 (1894). $BeSO_4 \cdot 4H_2O$ in an amount of 0.10 mole is dissolved in about 0.5 liter of water and the solution added to 0.25 mole of acetylacetone. Concentrated ammonia is then added slowly with stirring and the mixture warmed on a steam bath for about 15 minutes. Upon cooling, the beryllium acetylacetonate crystallizes as a white powder. Purification is accomplished by recrystallization from methyl alcohol.

Example II

Preparation of azelaoyldiacetone: A solution of the diethyl ester of azelaic acid (0.1 mole) and acetone (0.3 mole) in 200 ml. of anhydrous diethyl ether was added with agitation and under a nitrogen atmosphere to a diethyl ether suspension of 0.5 mole sodium amide. The reaction mixture was kept below 10° C. during the addition and then allowed to rise to room temperature under nitrogen for a period of about 15 hours. The heterogeneous reaction product was then poured onto crushed ice. The aqueous layer was separated and extracted several times with ether. After the aqueous layer had been neutralized to a pH of 8, the solid product was collected by filtration. This crude product was subjected to a rapid distillation at about 180° C. to 220° C. under a reduced pressure of 1 mm. Hg. The distillate was recrystallized repeatedly from methanol, and alternately, benzene petroleum ether. The tetrone was a white crystalline powder having a melting point of 72° C. to 73° C. Carbon and hydrogen content calculated on the basis of the empirical formula $C_{15}H_{24}O_4$ were 67.13 percent C and 9.01 percent H. Elemental analysis of the tetrone resulted in experimental findings of 67.18 percent C and 8.89 percent H.

Example III

Bis-(β-diketone)s having the general formula:

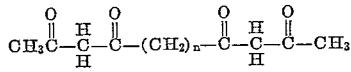

wherein $n$ has a value of 8, 10 and 12 were prepared according to the method of Example II. Empirical formulas, melting points, and results of elemental analysis are shown in tabular form below.

| $n$ | Empirical formula | Melting point, °C. | Calculated | | Found | |
|---|---|---|---|---|---|---|
| | | | Percent C | Percent H | Percent C | Percent H |
| 8 | $C_{15}H_{26}O_4$ | 77.8–78.5 | 68.05 | 9.28 | 68.21 | 9.13 |
| 10 | $C_{18}H_{30}O_4$ | 83.2–84.0 | 69.64 | 9.74 | 69.83 | 9.77 |
| 12 | $C_{20}H_{34}O_4$ | 88.0–89.0 | 70.97 | 10.12 | 71.06 | 9.99 |

Example IV

Preparation of cyclic monomer: Three grams (about 10 millimoles) of azelaoyldiacetone were mixed with a stoichiometric amount of $BeSO_4 \cdot 4H_2O$ in a flask equipped with magnetic stirring means. A mixture of 50 ml. distilled water and 10 ml. dioxane (purified by refluxing and distilling over sodium) was added and the stirred reaction mixture neutralized to pH 8 by the dropwise addition of sodium hydroxide (10 percent by weight aqueous solution). After the reaction mixture had been stirred for about 16 hours the low molecular weight condensation chelate polymer which was formed was separated from the reaction mass by filtration. The crude polymer was dried at 25° C. for 24 hours, and then sublimed at a reduced pressure of 1 mm. Hg at 200° C. to yield a crystalline, white solid cyclic monomer, having a melting point of 122 to 123° C.

Example V 3.00 grams (.0106 mole) of sebacoyldiacetone and 1.881 grams (.0106 mole) of $BeSO_4 \cdot 4H_2O$ were placed in a 125 ml. glass reaction vessel containing 50 ml. of distilled water and 10 ml. dioxane. With stirring (magnetic stirrer), the mixture was neutralized to pH 8, using aqueous 6 N NaOH. After 16 hours, 3.2 grams of crude condensation polymer were collected by filtration and dried. This low molecular weight material had a reduced viscosity (0.2 g./100 ml. benzene at 25° C.) of 0.05 and gave a crystalline X-ray powder spectrum identical with the starting tetraketone. Fractional precipitation from benzene with petroleum ether (B.P. 40° C. to 60° C.) indicated the presence of inorganic beryllium compounds, the starting tetraketone, and low molecular weight polymer molecules. Sublimation of the crude polymer at 200° C. at a pressure of 0.2 mm. Hg yielded 2.3 grams of pure cyclic monomer having a melting point of 138° C. to 140° C. Calculated molecular weight, 289; Be content, 3.1%; molecular weight determined experimentally (freezing point lowering, benzene) was 272; Be content 3.0%.

Example VI (A) A crystalline cyclic chelate monomer was prepared by controlled degradation of a low molecular weight chelate polymer mass which was formed according to the following procedure: A mixture consisting of 0.414 gram (.022 mole) beryllium acetylacetonate and 0.536 gram (.002 mole) 2,4,12,14-tetraketopentadecane was heated in a glass reactor at 150° C. and at atmospheric pressure for approximately 1 hour and for an additional period of about 6 hours at a temperature of about 200° C. under vacuum conditions. It was observed that acetylacetone was liberated from the condensation reaction during the course of the polymerization. The crude, low molecular weight polymer product consisted of an orange residue and had a reduced viscosity (0.2 g./100 ml. toluene at 25° C.) of 0.38. The crude polymer was heated at a temperature of about 210° C. and under 0.1 mm. Hg pressure. Under these conditions a pure crystalline cyclic chelate monomer was sublimed which had a melting point of 135° C. The residue remaining after the sublimation operation was partially insoluble in toluene indicating cross-linking had occurred.

(B) The crystalline cyclic monomer from part A was polymerized by heating to a temperature of 180° C. at atmospheric pressure. The resulting polymer was colorless and had a reduced viscosity (0.2 g./100 ml. toluene at 25° C.) of 1.05.

Example VII

Repeating the procedure of Example IV a number of cyclic monomers were prepared using different bis-(β-diketone)R compounds in the condensation reaction with beryllium sulfate. The crystalline cyclic monomers were then polymerized by heating at a temperature of about 180° C. at atmospheric pressure. The polymers produced were colorless and had high molecular weights as indicated by reduced viscosity values (0.2 g./100 ml. toluene at 25° C.) above 0.50. Data pertaining to the monomers, and to the polymers prepared therefrom is set forth in tabular form below:

| Bis (β-diketone) | | | Cyclicmonomer empirical formula | Monomer M.P. °C. | Analysis (Monomer) | | | | Reduced viscosity of polymer[1] |
|---|---|---|---|---|---|---|---|---|---|
| | | | | | Calculated | | Found | | |
| General formula | $n$ | M.P. °C. | | | Percent C | Percent H | Percent C | Percent H | |
| $(CH_3COCH_2CO)_2(CH_2)_n$ | 6 | 68 –69 | $C_{14}H_{20}O_4Be$ | 110 | 64.34 | 7.71 | 63.65 | 7.82 | |
| $(CH_3COCH_2CO)_2(CH_2)_n$ | 7 | 72 –73 | $C_{15}H_{22}O_4Be$ | 132 –135 | 65.43 | 8.06 | 66.02 | 7.70 | 0.52 |
| $(CH_3COCH_2CO)_2(CH_2)_n$ | 8 | 76 –76.5 | $C_{16}H_{24}O_4Be$ | 139 –140.5 | 66.41 | 8.36 | 66.71 | 8.66 | 0.62 |
| $(CH_3COCH_2CO)_2(CH_2)_n$ | 10 | 82 –83 | $C_{18}H_{28}O_4Be$ | 139 –140 | 68.11 | 8.89 | 68.43 | 9.12 | 1.30 |
| $(CH_3COCH_2CO)_2(CH_2)_n$ | 12 | 78.5–79.5 | $C_{20}H_{32}O_4Be$ | 141.5–143 | 69.53 | 0.34 | 69.86 | 9.41 | 0.59 |
| $(C_6H_5COCH_2CO)_2(CH_2)_n$ | 8 | 110 | $C_{25}H_{28}O_4Be$ | 176 –178 | | | | | |

[1] 0.2 g./100 ml. toluene at 25° C.

Example VIII

To a suspension of 2.54 grams of 2,4,11,13-tetraketotetradecane and 1.80 grams of beryllium sulfate tetrahydrate in 50 ml. of a 20% dioxane aqueous solution was added dropwise a 30% aqueous solution of sodium hydroxide until the reaction mixture reached a pH of 7. After the mixture was stirred for about 2 hours a low molecular weight chelate polymer had formed which was separted from the aqueous medium by filtration. After being dried in an air oven, the crude polymer was heated at 190° C. at a pressure of .05 mm. Hg in an apparatus provided with means to collect the material sublimed from the crude polymer. The initial sublimate collected was unpure and was discarded. The material which sublimed subsequently was collected into two distinct zones of the collection apparatus. Analysis of the sublimate from both zones indicated a compound of the same empirical formula, the more volatile of which was the monomer and the other, the dimer. Thermal polymerization of each material produced the same chelate polymer. The monomer is believed to have the structure:

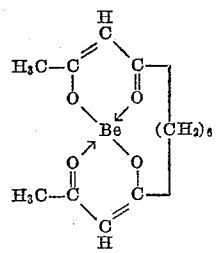

and the dimer the structure:

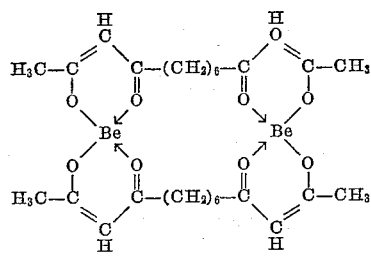

Melting point of the dimer was found to be 230° C. Calculated carbon and hydrogen content, 64.34% and 7.71% respectively; Found, 64.31% carbon and 7.54% hydrogen.

Example IX

Preparation of bis-(acetoacetic esters):

(A) A mixture consisting of .35 mole hydroxyquinone bis (hydroxyethyl)ether; 1.0 mole ethylacetoacetate, and 200 ml. of dry toluene was distilled through an efficient column. Ethyl alcohol resulting from the condensation reaction of the ester and the diol was removed as the toluene azeotrope which boils at 76.7° C. at 1 atmosphere. When the temperature of the distillate reached 105° C. the residual material was stripped in vacuo at 105° C. to give essentially a quantitative yield of the bis-(acetoacetonate) having the formula:

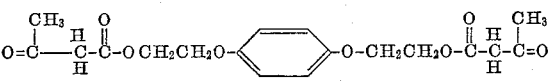

and having a melting point of 87 to 88° C. Calculated carbon and hydrogen content based on $C_{18}H_{22}O_8$ is 59.01% and 5.42% respectively: Found; carbon 58.45%, hydrogen 5.81%.

(B) Using substantially the same formulation and procedure as in part (A) with the exception that different diols were substituted for hydroxyquinone bis-(hydroxyethyl) ether used therein, bis-(β-dicarbonyl)R compounds were prepared having the general formula

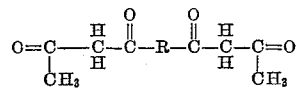

wherein R is:

(a) —O—$(CH_2)_4$—O—
(b) —O—$(CH_2)_6$—O—
(c) —O—$(CH_2)_{10}$—O—
(d) —O—$(CH_2CH_2O)_3$—

The assigned structure was confirmed by infra red spectra which contained a major absorption at 5.75μ and a weaker absorption at 6.05μ.

Example X

Each of the bis(β-dicarbonyl)R compounds prepared in Example IX, was reacted with a soluble beryllium salt to form a low molecular weight polymer. In each case stoichiometric amounts of the bis-(β-dicarbonyl)R compound and beryllium nitrate were dissolved in an aqueous dioxane solution containing 50% by volume of dioxane to bring about efficient solution. The solution was neutralized to pH 7 with aqueous sodium hydroxide and stirred approximately 16 hours at 25° C. The crude condensation chelate polymer formed was filtered from the residue of the reaction mass and dried in air. The crude polymer was then heated to 150 to 180° C. under vacuum conditions (0.05 mm. Hg) and the crystalline sublimate produced was collected. The sublimate resulting from the low molecular weight polymer produced from the bis(β-dicarbonyl)R compound in which R is —O—$(CH_2)_4$—O— was primarily the dimeric form. In all other cases the principal form of the crystalline sublimate was monomeric.

Example XI (A) Each of the bis-(β-dicarbonyl)R compounds prepared in Example IX was reacted with an organic ester complex of beryllium to form a low molecular weight polymer. In each case a stoichiometric amount of the bis-(β-dicarbonyl)R compound and beryllium ethyl acetoacetate were admixed and heated at atmospheric pressure for about 30 minutes at a temperature of about 130° C. to 140° C. At the end of this period, the pressure over the reaction mixture was decreased to about 100 mm. Hg and maintained for about 1 hour. The residual glassy polymer resulting from the condensation reaction was then heated at 150° C. and at an absolute pressure of 0.05 mm. Hg to degrade the polymer and sublime the pure crystalline monomer or dimer. In all cases the final products were identical with those prepared by the method of example X.

(B) The crystalline cyclic products from part A were polymerized by being heated to temperatures at least 140° C. or to their respective melting points, whichever was higher. The polymers were clear and colorless and had reduced viscosity values (0.2 g./100 ml. toluene at 75° C.) of greater than 0.5.

*Example XII*

(A) Preparation of bis-acetoacetamide: To a solution of 0.1 mole 1,6-diaminohexane in 100 ml. dry acetone at 0° C. was added dropwise 0.2 mole of diketene with stirring. The reaction mixture was maintained at about 0° C. for 30 minutes at the end of this period, the bis-acetoacetamide product was separated by filtration and recrystallized from methanol. Yield—70% of theoretical. Melting point range 150° C. to 150.5° C. Calculated carbon, hydrogen and nitrogen percent, 59.13, 8.51 and 9.85 respectively; Found; 59.69, 8.52, and 9.68 percent respectively. Calculated values were based on the formula $(CH_3COCH_2CONH)_2(CH_2)_6$.

(B) The procedure and formulations employed in part A was repeated except that 1,10-diaminodecane was substituted as the diamine reactant. Melting point of the bis-acetoacetamide was 150 to 152° C. Calculated C, H and N content based on $$(CH_3COCH_2CONH)_2(CH_2)_{10}$$

was 63.50, 9.47 and 8.23% respectively; Found, 63.70, 9.46 and 8.16% respectively

*Example XIII*

Crystalline cyclic chelate monomers were prepared using the bis-acetoacetamide compounds of Example XII. In two separate experiments, each of the two bis-acetoacetamide compounds was reacted with a stoichiometric amount of beryllium chloride in an aqueous dioxane medium (dioxane content, 20% by volume). The reaction mixture was maintained at a pH of 7 for about 8 hours and at a temperature of 25° C. during which time the mixture was moderately stirred. A low molecular weight chelate polymer was produced in both experiments which was separated by filtration and air dried. The crude polymer was then heated at temperatures in the range of 180° C. to 200° C. under vacuum conditions (0.05 mm. Hg) to produce crystalline cyclic chelate monomers. The crystalline cyclic chelate monomer formed from $(CH_3COCH_2CONH)_2$—$(CH_2)_6$ was found to have a melting point of 250° C. The monomer formed from $(CH_3COCH_2CONH)_2(CH_2)_{10}$ was found to have a melting point of 243 to 245° C. When heated at atmospheric pressure to a temperature slightly above 250° C. each of the cyclic monomers polymerized to form high molecular weight solid polymers.

*Example XIV*

Using the procedures of Example IX from 36.8 g. of ethyl trifluoroacetoacetate, 11.8 g. of hexamethylene glycol and 100 ml. toluene was obtained in 80% yield hexamethylene bis[trifluoroacetoacetate] B.P. 110–112 (0.1 mm.), M.P. 36–39°, calculated percent F. 28.9; found 28.4.

This was converted to a low polymer by the method of Example X and this material sublimed at 160–200° (0.1 mm.) producing the cyclic monomer as sublimate M.P. 96–100°. Above its melting point it polymerized to a high molecular weight polymer.

As is evident from the foregoing examples the chelate polymers produced according to the present invention have average molecular weights, as indicated by the reduced viscosity values, which by prior known processes have been unattainably high. Reduced viscosity values appearing throughout the specification and in the appended claims refer to a solution of the polymer at 25° C. consisting of 0.2 gram of polymer dissolved in 100 ml. of toluene. These high molecular weights are achieved by the novel process of this invention regardless of whether cyclic chelate monomers or cyclic chelate dimers are thermally polymerized, since both molecular species provide the same advantages described above.

Although low molecular weight chelate polymers have previously been prepared by reacting a bis-(β-diketone)R compound with a variety of compounds containing metals other than beryllium, I have found that these polymers are not in general capable of being degraded under controlled conditions to produce cyclic crystalline monomers or dimers. On the other hand the isolation of a cyclic monomer or dimer does not assure the production of high molecular weight polymers since the monomer or dimer may decompose before its temperature can be raised to the point at which practical addition polymerization occurs. Thus, even though numerous structurally similar metal chelate reaction products of bis-(β-diketone)R compounds not coming within the defined limits hereinbefore set forth are known, they have been found to be not functional equivalents of the reactants employed in the invention.

The condensation polymers formed by reaction of a beryllium salt and any of the bis-(β-dicarbonyl)R compounds described hereinbefore are therefore unique in that not only are they capable of producing crystalline cyclic chelate monomers and dimers, but these monomers and dimers may readily be thermally polymerized into high molecular weight polymers. Because the final polymers are in no way distinguishable solely on the basis of whether they were formed from monomeric or dimeric starting material, the cyclic crystalline monomer and the cyclic crystalline dimer may conveniently be designated by the term "large ring chelate" which is defined as a chelate of beryllium having at least one ring consisting of more than six atom members including one or more beryllium atoms involved in chelation and is so used in the appended claims.

The determining factor as to which of the bis-(β-dicarbonyl)R compounds within the scope of this invention form monomeric compounds and which form dimeric compounds is the steric nature of the R group in the genral formula:

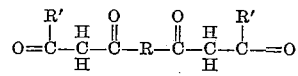

It has been found that when R has the structure

those compounds in which $n$ has a value of from .4 to 5 form dimeric molecules exclusively upon polymer decomposition and those compounds in which $n$ has a value of 7 to 16 form monomeric molecules. When $n$ is 6, both the monomeric and dimeric large ring chelate compound may be produced. In those R groups which contain amino, nitrogen, ether oxygen, or phenylene linkages, nitrogen and oxygen atoms may be considered as substantially equivalent to one —$CH_2$— group each for the purposes of determining whether monomers or dimers will be formed upon controlled degradation of the intermediate low molecular weight condensation polymer. When the phenylene group is bonded through the 1,3 or 1,4-position it is equivalent to one —$CH_2$— group; when bonding is through the 1,2 positions, it is equivalent to two —$CH_2$— groups.

The polymers resulting from the addition polymerization of large ring chelate compounds consist of a plurality of spirane type symmetrical units represented by the following molecular structure:

[chemical structure diagram showing repeating spirane units with Be centers, R groups, R' substituents, and C=O/CH groups]

The polymers are colorless, have high molecular weights, and are characterized by their high thermal stability and resistance to attack by dilute acids and bases. These properties make the polymers especially suitable for shaped or molded articles, fibers, and films all of which may be fabricated by conventional molding, spinning or casting techniques.

What is claimed is:

1. A process for preparing a high molecular weight chelate polymer which comprises reacting a bis-($\beta$-dicarbonyl)R compound having the general formula:

$$O=\overset{R'}{\underset{H}{C}}-\overset{H}{\underset{}{C}}-\overset{O}{\underset{}{C}}-R-\overset{O}{\underset{}{C}}-\overset{H}{\underset{}{C}}-\overset{R'}{\underset{H}{C}}=O$$

wherein R' is a monovalent hydrocarbon radical and R is a member selected from the group consisting of
  (a) —$(CH_2)_n$— in which $n$ is an integer having a value of from 4 to 16;
  (b) —O—$(CH_2)_n$—O— in which $n$ is an integer having a value of from 4 to 10;
  (c) —$\overset{H}{N}$—$(CH_2)_n$—$\overset{H}{N}$—
  (d) —O—$(CH_2CH_2O)_3$—
  (e) —OCH$_2$CH$_2$—O—[phenyl ring]—O—CH$_2$CH$_2$O— with a salt of beryllium to form a relatively low molecular weight chelate condensation polymer, thermally degrading the said polymer under vacuum to produce a large ring chelate compound, isolating said large ring chelate compound by sublimation, and thereafter thermally polymerizing the sublimate to produce a high molecular weight chelate polymer.

2. A process as defined in claim 1 in which R' is an alkyl group containing from 1 to 6 carbon atoms.

3. A process for preparing a high molecular weight chelate polymer which comprises reacting a bis-($\beta$-dicarbonyl)R compound having the general formula:

$$O=\overset{R'}{\underset{H}{C}}-\overset{H}{\underset{}{C}}-\overset{O}{\underset{}{C}}-(CH_2)_n-\overset{O}{\underset{}{C}}-\overset{H}{\underset{}{C}}-\overset{R'}{\underset{H}{C}}=O$$

wherein R' is a monovalent hydrocarbon radical and $n$ is an integer having a value of from 4 to 16 with a salt of beryllium to form a relatively low molecular weight chelate condensation polymer, thermally degrading the said polymer at reduced pressure to produce a large ring chelate compound, isolating said large ring chelate compound by sublimation, and thereafter polymerizing the sublimate at a temperature at least as high as the melting point of said large ring chelate sublimate whereby a high molecular weight chelate polymer is formed.

4. A process for preparing a high molecular weight chelate polymer which comprises reacting a bis-($\beta$-dicarbonyl)R compound having the general formula:

$$O=\overset{R'}{\underset{H}{C}}-\overset{H}{\underset{}{C}}-\overset{O}{\underset{}{C}}-O-(CH_2)_n-O-\overset{O}{\underset{}{C}}-\overset{H}{\underset{}{C}}-\overset{R'}{\underset{H}{C}}=O$$

wherein R' is a monovalent hydrocarbon radical and $n$ is an integer having a value of from 4 to 10 with a salt of beryllium to form a relatively low molecular weight chelate condensation polymer, thermally degrading the said polymer at reduced pressure to produce a large ring chelate compound, isolating said large ring chelate compound by sublimation, and thereafter polymerizing the sublimate at a temperature at least as high as the melting point of said large ring chelate sublimate whereby a high molecular weight chelate polymer is formed.

5. A process for preparing a high molecular weight chelate polymer which comprises reacting a bis-($\beta$-dicarbonyl)R compound having the general formula:

$$O=\overset{R'}{\underset{H}{C}}-\overset{H}{\underset{}{C}}-\overset{O}{\underset{}{C}}-\overset{H}{\underset{}{N}}-(CH_2)_n-\overset{H}{\underset{}{N}}-\overset{O}{\underset{}{C}}-\overset{H}{\underset{}{C}}-\overset{R'}{\underset{H}{C}}=O$$

wherein R' is a monovalent hydrocarbon radical and $n$ is an integer having a value of from 4 to 10 with a salt of beryllium to form a relatively low molecular weight chelate condensation polymer, thermally degrading the said polymer at reduced pressure to produce a large ring chelate compound, isolating said large ring chelate compound by sublimation, and thereafter polymerizing the sublimate at a temperature at least as high as the melting point of said large ring chelate sublimate whereby a high molecular weight chelate polymer is formed.

6. A process for preparing a high molecular weight chelate polymer which comprises reacting a bis-($\beta$-dicarbonyl) compound having the general formula:

$$O=\overset{R}{\underset{H}{C}}-\overset{H}{\underset{}{C}}-\overset{O}{\underset{}{C}}-O-(CH_2CH_2O)_3-\overset{O}{\underset{}{C}}-\overset{H}{\underset{}{C}}-\overset{R}{\underset{H}{C}}=O$$

wherein R is a monovalent hydrocarbon radical with a salt of beryllium to form a relatively low molecular weight chelate condensation polymer, thermally degrading the said polymer at reduced pressure to produce a crystalline cyclic chelate monomer, isolating said monomer, by sublimation and thereafter polymerizing the monomer at a temperature at least as high as the melting point of said monomer whereby a high molecular weight chelate polymer is formed.

7. A process for preparing a high molecular weight chelate polymer which comprises reacting a bis-($\beta$-dicarbonyl) compound having the general formula:

$$O=\overset{R}{\underset{H}{C}}-\overset{H}{\underset{}{C}}-\overset{O}{\underset{}{C}}-O-CH_2CH_2O-[phenyl]-O-CH_2CH_2-O-\overset{O}{\underset{}{C}}-\overset{H}{\underset{}{C}}-\overset{R}{\underset{H}{C}}=O$$

wherein R is a monovalent hydrocarbon radical with a salt of beryllium to form a relatively low molecular weight chelate condensation polymer, thermally degrading the said polymer at reduced pressure to produce a crystalline cyclic chelate monomer, isolating said monomer by sublimation, and thereafter polymerizing the monomer at a temperature at least as high as the melting point of said monomer whereby a high molecular weight chelate polymer is formed.

8. A process for preparing a crystalline cyclic chelate monomer which comprises reacting a bis-($\beta$-dicarbonyl)R compound having the general formula:

$$O=\overset{R'}{\underset{H}{C}}-\overset{H}{\underset{}{C}}-\overset{O}{\underset{}{C}}-R-\overset{O}{\underset{}{C}}-\overset{H}{\underset{}{C}}-\overset{R'}{\underset{H}{C}}=O$$

wherein R' is a monovalent hydrocarbon radical and R is a member selected from the group consisting of
  (a) —$(CH_2)_n$— in which $n$ is an integer having a value of from 6 to 16;
  (b) —O—$(CH_2)_n$—O— in which $n$ is an integer having a value of from 6 to 10;
  (c) —$\overset{H}{N}$—$(CH_2)_n$—$\overset{H}{N}$— in which $n$ is an integer having a value of from 6 to 10;

(d) —O—(CH$_2$CH$_2$O)$_3$—

(e)

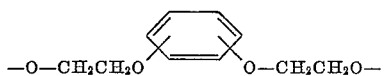

with a salt of beryllium to form a relatively low molecular weight chelate condensation polymer, thermally degrading said polymer at a temperature in the range of from about 150° C. to about 225° C. and at an absolute pressure of not greater than about 50 mm. Hg to form a cyclic chelate monomer sublimate, and condensing said sublimate at temperature below its melting point.

9. A process as defined in claim 8 in which R is a straight chain alkylene hydrocarbon containing from 6 to 12 carbon atoms, and R' is a lower alkyl group.

10. A process as defined in claim 8 in which R has the formula —O—(CH$_2$)$_n$—O— in which $n$ is an integer having a value of from 6 to 10, and R' is a lower alkyl group.

11. A process as defined in claim 8 in which R has the formula:

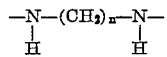

in which $n$ is an integer having a value of from 6 to 10, and R' is a lower alkyl group.

12. A process as defined in claim 8 in which R is

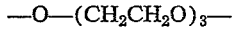

and R' is a lower alkyl group.

13. A process as defined in claim 8 in which R is

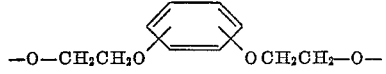

and R' is a lower alkyl group.

14. A substantially pure crystalline cyclic chelate monomeric compound of beryllium having the general structural formula:

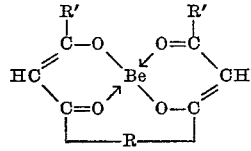

wherein R' is a monovalent hydrocarbon radical and R is a member selected from the group consisting of (a) —(CH$_2$)$_n$— in which $n$ is an integer having a value of from 6 to 16;

(b) —O—(CH$_2$)$_n$—O— in which $n$ is an integer having a value of from 6 to 10;

(c)

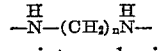

in which $n$ in an integer having a value of from 6 to 10;

(d) —O—(CH$_2$CH$_2$)$_3$—

(e)

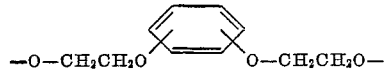

15. The crystalline cyclic chelate monomer of claim 14 in which R is a straight chain alkylene hydrocarbon containing from 6 to 12 carbon atoms, and R' is a lower alkyl group.

16. The crystalline cyclic chelate monomer of claim 14 in which R has the formula —O—(CH$_2$)$_n$—O in which $n$ is an integer having a value of from 6 to 10, and R' is a lower alkyl group.

17. The crystalline cyclic chelate monomer of claim 14 in which R has the formula

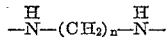

in which $n$ in an integer having a value of from 6 to 10, and R' is a lower alkyl group.

18. The crystalline cyclic chelate monomer of claim 14 in which R is —O—(CH$_2$CH$_2$O)$_3$— and R' is a lower alkyl group.

19. The crystalline cyclic chelate monomer of claim 14 in which R is

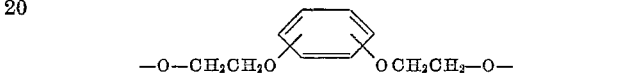

and R' is a lower alkyl group containing from 1 to 6 carbon atoms.

20. A colorless high molecular weight beryllium containing chelate polymer characterized by having a reduced viscosity value greater than 0.5 and being substantially free from chemical contaminants, said polymer having a linear chain of a plurality of recurring units represented by the following general structural formula:

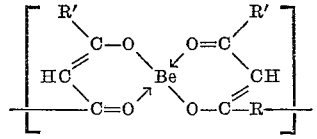

wherein R' is a monovalent hydrocarbon radical and R is a divalent organic radical selected from the group consisting of (a) —(CH$_2$)$_n$— in which $n$ is an integer having a value of from 4 to 16;

(b) —O—(CH$_2$)$_n$—O— in which $n$ is an integer having a value of from 4 to 10;

(c)

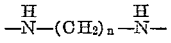

in which $n$ is an integer having a value of from 4 to 10;

(d) —O—(CH$_2$CH$_2$O)—;

(e)

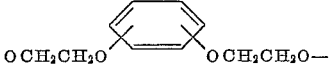

References Cited in the file of this patent
UNITED STATES PATENTS 2,659,711    Wilkins et al.    Nov. 17, 1953
2,765,284    Bersworth    Oct. 2, 1956